United States Patent [19]

Forsten

[11] 4,100,323

[45] Jul. 11, 1978

[54] SCRIMLESS FILTER FELT

[75] Inventor: Herman Hans Forsten, Hockessin, Del.

[73] Assignee: E. I. Du Pont de Nemours and Company, Wilmington, Del.

[21] Appl. No.: 840,361

[22] Filed: Oct. 7, 1977

Related U.S. Application Data

[63] Continuation-in-part of Ser. No. 681,580, Apr. 29, 1976, abandoned.

[51] Int. Cl.² .............................................. D04H 1/08
[52] U.S. Cl. ..................................... 428/280; 28/104; 55/DIG. 16; 55/528; 428/300; 428/359
[58] Field of Search .................. 428/280, 300, 359; 28/104; 55/528, DIG. 16

[56] References Cited

U.S. PATENT DOCUMENTS

| 2,910,763 | 11/1959 | Lauterbach | 428/300 |
| 3,133,138 | 5/1964 | Alexander | 264/290 |
| 3,920,428 | 11/1975 | Kinsley | 55/528 |
| 3,937,860 | 2/1976 | Gusman et al. | 428/228 |

FOREIGN PATENT DOCUMENTS

1,417,696   12/1975   United Kingdom.

*Primary Examiner*—James J. Bell

[57] ABSTRACT

A scrimless, dimensionally stable filter felt suitable for high temperature gas filtration is comprised of at least 80% by weight poly(m-phenylene isophthalamide) staple fibers having at least a low degree of crystallinity and a staple length of 4 to 16 cm., and has a felt density of 0.15 to 0.4 g./cm.$^3$ and an air permeability of 3 to 30 m.$^3$/min./m.$^2$ (0° C. basis pressure differential = 1.27 g./cm.$^3$.

4 Claims, No Drawings

SCRIMLESS FILTER FELT

CROSS REFERENCE TO RELATED APPLICATION

This application is a continuation-in-part of U.S. Pat. application Ser. No. 681,580 filed Apr. 29, 1976 now abandoned.

BACKGROUND OF THE INVENTION

This invention relates to felts comprised predominantly of poly(m-phenylene isophthalamide) staple fibers and a process for preparing the felts.

Synthetic fiber felts are known, e.g. from U.S. Pat. No. 2,910,763 which teaches preparation of the felts from batts of retractable staple fibers which have been needle-punched and then treated to cause the fibers to retract whereby the batt is compacted and the area of the batt is reduced, usually by at least ½. The product of the percentage of retractable fibers in the batt and the percentage retractability of the fibers must be not less than 2,000.

Retractable poly(m-phenylene isophthalamide) fibers are known, e.g. from U.S. Pat. No. 3,133,138 which describes a process for crystallizing amorphous retractable poly(m-phenylene isophthalamide) fibers to prevent excess shrinkage by heating drawn fibers at 300°–350° C. while allowing no more than 10% shrinkage of the fibers. The crystallized poly(m-phenylene isophthalamide) fibers are only slightly retractable and have a high degree of crystallinity.

Commercial poly(m-phenylene isophthalamide) fibers are normally crystallized to avoid the excess shrinkage noted above. Also, shrinkage of amorphous poly(m-phenylene isophthalamide) fibers is cumulative, i.e. repeated heating cycles in hot water or steam followed by dry heat cause further shrinkage each cycle.

It is known to prepare fabrics and felts of crystalline poly(m-phenylene isophthalamide) fibers. These fabrics and felts are particularly useful in the filtration of hot gases, e.g. at 200° C. where other fibers such as polyester, acrylics, wool and nylon are not useful. Felts of crystalline poly(m-phenylene isophthalamide) fibers suffer from relatively poor dimensional stability and low strength. The lack of stability of these felts requires that the crystalline poly(m-phenylene isophthalamide) fiber batts be supported by a woven scrim to provide the required stability even though the poly(m-phenylene isophthalamide) fibers themselves have excellent dimensional stability. Even when supported by a scrim, crystalline poly(m-phenylene isophthalamide) fiber felts require calendering to achieve a sufficiently low air permeability and have poor dimensional stability and poor strength retention under certain conditions.

SUMMARY OF THE INVENTION

The present invention provides poly(m-phenylene isophthalamide) fiber felts which are stable to mechanical working and do not require a supporting scrim. Further, the felts do not undergo cumulative shrinkage characteristic of amorphous poly(m-phenylene isophthalamide) fibers.

This invention provides a needled, dimensionally stable, scrimless felt comprised of at least 80% by weight poly(m-phenylene isophthalamide) staple fibers having at least a low degree of crystallinity and a staple length of 4 to 16 cm., a felt density of 0.15 to 0.4 g./cm.$^3$ and an air permeability of 3 to 30 m.$^3$/min./m.$^2$ (0° C basis, pressure differential = 1.27 g./cm.$^2$). Preferably 100% by weight of the fibers are poly(m-phenylene isophthalamide). Preferably the felt density is 0.2 to 0.3 g./cm.$^3$ and the air permeability is 6 to 10 m.$^3$/min./m.$^2$.

This invention also provides a process for the preparation of a needled, dimensionally stable, scrimless felt comprising the steps of (1) preparing a batt containing at least 80% by weight drawn, amorphous poly(m-phenylene isophthalamide) staple fibers having a length of 4 to 16 cm. and a 285° C. shrinkage of at least 10%, (2) needling the batt on a needle loom to the extent of 150 to 1000 needle penetrations/cm.$^2$ and (3) treating the needled batt while under lateral and longitudinal restraint sufficient to prevent more than 10% lateral or longitudinal shrinkage of the batt under conditions such that the unrestrained shrinkage of the fibers would be at least 10%. Preferably the needled batt is heated at 280° to 350° C. for 1 to 900 seconds. Preferably the starting batt is a cross-lapped batt of amorphous, carded 100% poly(m-phenylene isophthalamide) staple fibers and the batt is needle punched to the extent of 460 to 775 needle penetrations/cm.$^2$. It is further preferred that the heating temperature is 285°–305° C. and the heating time is 60–180 seconds. Most preferably, essentially no lateral or longitudinal shrinkage of the felt is permitted.

The felts of this invention are particularly useful in the filtration of hot gases, e.g. gases at temperatures as high as 200° C. or even higher. As compared to calendered, scrim-supported felts prepared from crystalline poly(m-phenylene isophthalamide) fibers, the felts of this invention are more dimensionally stable to heat and mechanical working, are strong enough to be used without a supporting scrim and provide useful levels of filtration at lower fabric weights.

DETAILED DESCRIPTION OF THE INVENTION

The starting batts of the present invention can be prepared by any known means such as air laying, wet laying, etc. but are preferably prepared by cross-lapping a carded batt. The starting batts can be needled to the desired level by one or more passes through a needle loom.

When less than 100% by weight amorphous poly(m-phenylene isophthalamide) fibers are used to prepare the starting batt, the remaining fibers are preferably heat resistant fibers such as crystalline aromatic polyamide fibers, phenolic fibers, glass fibers, polyimide fibers, etc.

The amorphous poly(m-phenylene isophthalamide) starting fibers should be drawn in a manner so as to provide a shrinkage in 285° C. air of at least 10% and preferably 20% or more.

By "at least a low level of crystallinity" it is meant that a radial scan of an X-ray diffraction pattern of the fiber shows a peak at 2θ of about 27°.

By "dimensionally stable" is meant that the structure of the felt remains relatively constant during use so that the air permeability also remains relatively constant during use.

Heating of the needled batts is preferably carried out by tentering in hot air but other methods of heating under restraint can be used. For example, the needled batt can be heated with hot air while being restrained between screen belts.

Alternative treatments of the needled batts are solvent treatments, e.g. 50% aqueous N,N-dimethylacetamide at the boil for 16 hours and treatments, with high pressure steam, e.g. 5.27 kg/cm.² steam for 30 minutes, such treatment being sufficient to provide at least a low level of crystallinity in the fibers.

EXAMPLES

The following examples are illustrative of the present invention but are not intended to be limiting.

EXAMPLE I

A. A carded, cross-lapped batt was prepared from 1.5 denier crystalline poly(m-phenylene isophthalamide) filaments cut to a length of 7.62 cm. The filaments had tenacity/elongation/modulus of 4.2 gpd/40%/70 gpd and shrink less than 3% at 285° C. Several layers of the batt were combined along with a 102 g./m.² woven scrim of the same fibers and needled in a needle loom to the extent of 755 penetrations/cm.². The needled batt was calendered at 177° C. to give a 0.198 cm. thick felt having an area weight of 495 g./cm.². The breaking strength/breaking elongation was 13.4 kg./cm./116% (longitudinal) and 36.3 kg./cm./64% (transverse). The air permeability was 10.2 m.³/min./m.² (0° C. basis, differential pressure = 1.27 g./cm.²). This is felt A.

B. A similar felt was prepared under the same conditions using 1.5 denier amorphous poly(m-phenylene isophthalamide) filaments cut to a length of 7.62 cm. The filaments have tenacity/elongation/modulus of 3.7 gpd/65%/50 gpd and shrink 20% at 285° C. Several layers of the batt were combined and needled in a needle loom to the extent of 775 penetrations/cm.² to give a 0.307 cm. thick batt having an area weight of 498 g./m.². The longitudinal breaking strength was 15.5 kg./cm. and the breaking elongation was 68%. The transverse breaking strength was 15.0 kg./cm. and the breaking elongation was 80%. Average modulus was 76.9 kg./cm. and the air permeability was 11.5 m.³ per minute per square meter of surface (0° C. basis, differential pressure = 1.27 g./cm.²). The needled batt was tentered at 288° C. for two minutes permitting no transverse or longitudinal shrinkage. The heat treated, needled batt had an area weight of 437 g./m.² and was 0.193 cm. thick. The longitudinal breaking strength was 22.3 kg./cm. and the breaking elongation was 47%. The lateral breaking strength was 23.4 kg./cm. and the breaking elongation was 49%. The average modulus was 2191 kg./cm. and the air permeability was 8.2 m.³ per minute per square meter of surface (0° C. basis, differential pressure = 1.27 g./cm.²). This is felt B.

Felts A and B were tested for dimensional stability by washing for 14 minutes in an automatic home washing machine in 40° C. water using no soap and spun dry. The felts were then tumble dried at 70° C. for one hour in a home drier. The results are summarized in the following table.

| | Air Permeability m.³min./m² (0°C. basis, 1.27g./cm.² Diff. P) | | | |
|---|---|---|---|---|
| Test cycle | 0 | 1 | 2 | 3 |
| Felt A | 10.2 | 16.4 | 19.2 | 20.7 |
| Felt B | 8.2 | 7.7 | 7.3 | 7.3 |

EXAMPLE II 1.5 denier amorphous poly(m-phenylene isophthalamide) filaments were cut to a length of 7.62 cm. The tenacity/elongation/modulus of the cut filaments was 3.7 gpd/65%/50 gpd. The cut filaments were Garnett carded and cross-lapped to give a 153 g./m.² batt. Four layers of batt were combined and needled in a needle loom 78 penetrations/cm.² using a needle penetration of 1.27 cm. The area weight was 448 g./m.². The batt was further needled to provide 156 penetrations/side or a total of 312 penetrations/cm.². An additional layer of 153 g./m.² batt was added and the combined batt was needled 156 penetrations/cm.² and then another 156 penetrations/cm.² on each side for a total of 780 penetrations/cm.². The needled composite batt had an area weight of 424 g./m.², was 0.284 cm. thick and had an air permeability of 18.9 m.³/min./m.² surface (0° C. basis, pressure differential = 1.27 g./cm.²). The needled batt was tentered at 288° C. for 45 seconds permitting no lateral or longitudinal shrinkage. The properties of the as needled and tentered batts are summarized below:

| | As Needled | Tentered |
|---|---|---|
| Area Weight g./m.² | 424 | 397 |
| Thickness cm. | .284 | .163 |
| Breaking Strength* kg./cm. | 9.29 | 14.7 |
| Breaking Elongation*% | 63 | 47 |
| Air Permeability m.³/min./m.² | 18.9 | 14.3 |

*Average for longitudinal and transverse directions.

The dimensional stability was tested in home laundry equipment as in Example I. The results are summarized in the following Table:

| | Cycles | | | |
|---|---|---|---|---|
| | 0 | 1 | 2 | 3 |
| Thickness, cm. | .175 | .201 | .208 | .213 |
| Air Permeability, m.³/min./m.² | 14.9 | 13.4 | 14.3 | 14.3 |

Filter bags 122 cm. long and 11.4 cm. in diameter were prepared from the above tentered batt and tested in a jet-pulse bag house (Mikro-Pul Division of U.S. Filter Corp.) at 204° C. using a face velocity of 3 m.³/min./m.², a pulse rate of 2 cycles/min., a pulse duration of 0.15 sec. and a pulse pressure of 6.33 kg./cm.². Also tested were filter bags similar to felt A of Example I except that the thickness was 0.203 cm. and the air permeability was 10.1 m.³/min./m.². The results are summarized below:

| Felt of This Example | Original | After 3 Weeks |
|---|---|---|
| Thickness, cm. | .193 | .196 |
| Air Permeability, m.³/min./m.² | 13.4 | 12.2 |
| Felt A | | |
| Thickness, cm. | .203 | .259 |
| Air Permeability, m.³/min./m.² | 10.1 | 15.5 |

One wash cycle has been found to correspond to the mechanical working received in an actual bag house over a two month period.

What is claimed is:

1. A needled, dimensionally stable, scrimless filter felt comprised of at least 80% by weight poly(m-phenylene isophthalamide) staple fibers having at least a low degree of crystallinity and a staple length of 4 to 16 cm., a felt density of 0.15 to 0.4 g./cm.³ and an air permeability of 3 to 30 m.³/min./m.² (0° C. basis, pressure differential = 1.27 g./cm.²), said felt having been heated at 280–350° C under restraint for 1 to 900 seconds.

2. The felt of claim 1 wherein 100% by weight of the fibers are poly(m-phenylene isophthalamide).

3. The felt of claim 2 wherein the felt density is 0.2 to 0.3 g./cm.³.

4. The felt of claim 3 wherein the permeability is 6 to 10 m.³/min./m.².

* * * * *